Patented Sept. 7, 1937

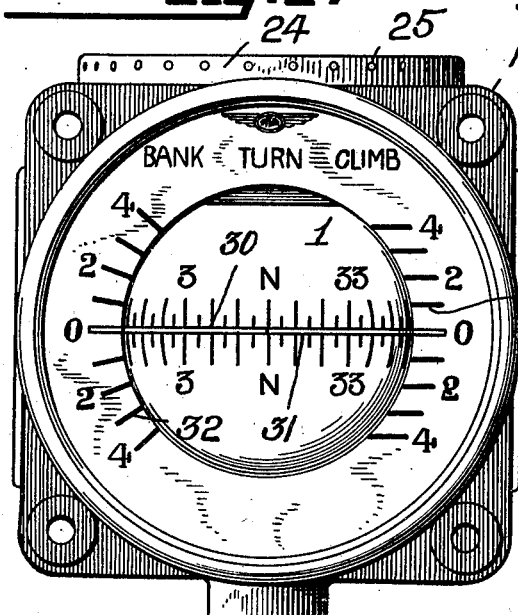
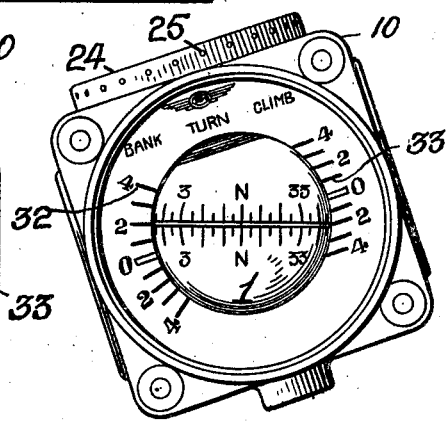
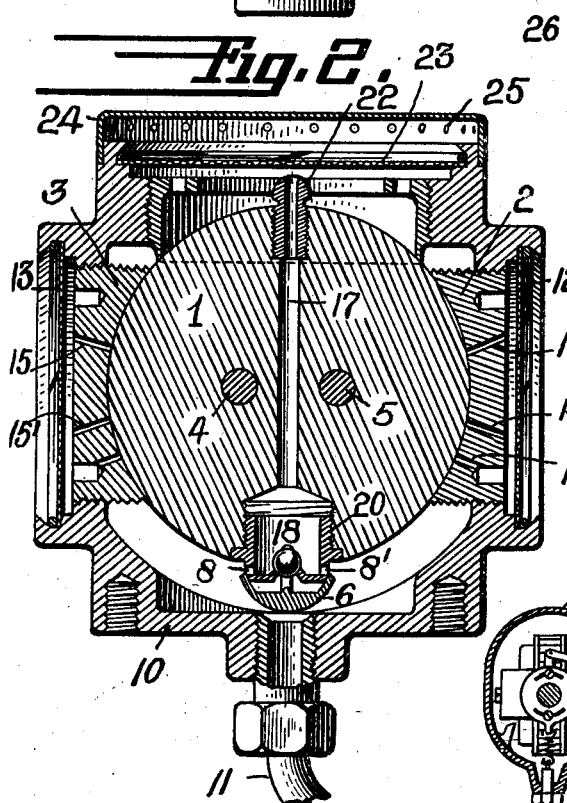
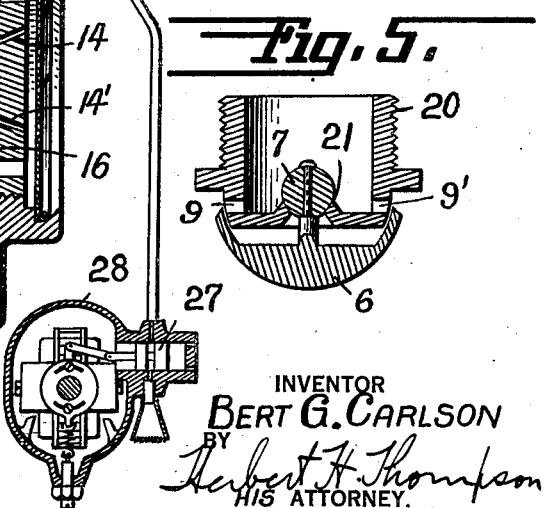

2,091,963

UNITED STATES PATENT OFFICE 2,091,963

ATTITUDE COMPASS

Bert G. Carlson, Freeport, N. Y., assignor to Sperry Gyroscope Company, Inc., Brooklyn, N. Y., a corporation of New York Application November 2, 1934, Serial No. 751,142
Renewed January 7, 1937

12 Claims. (Cl. 33—222)

This invention relates to a combined magnetic compass and attitude indicator for aircraft, showing in one instrument and by one simple element direction, banking angle and pitching angle.

Referring to the drawing showing one form my invention may assume,

Fig. 1 is a face view of my combined instrument.

Fig. 2 is a vertical section of the same.

Fig. 3 is a view similar to Fig. 1, on a smaller scale, showing the appearance of the device when the airplane is banking.

Fig. 4 is a similar view, showing the appearance when the plane is ascending or pitching upwardly.

Fig. 5 is a detail of the air erecting device taken at right angles to Fig. 2.

My combined instrument comprises essentially a ball 1, universally supported or floated for movement in all directions in a pair of cups 2 and 3, the inner surfaces of which freely but closely fit the spherical surface of the ball with just enough clearance to permit forcing a supporting air film therebetween. Supported within the ball on a normally horizontal axis are one or more permanent magnets 4 and 5 to give the device directive force. The ball and its supported parts are preferably supported in neutral equilibrium so that it is not pendulous about any axis.

For maintaining the magnets or magnetic needles normally horizontal, I have shown an air erection device for exerting torques about the horizontal axis of the ball in case the ball tilts from its normal position in any direction. Said device is shown as consisting of a small pendulous shutter 6 pivoted at the bottom of the ball on a ball pivot 7 so as to be free to oscillate in any direction. Said shutter is shown as partially closing a plurality of air ports 8, 8' and 9, 9', the two pairs being at right angles to each other. If air is continuously supplied to said ports, it will be seen that as long as the vertical axis of the ball, as shown in Fig. 2, lies in the vertical axis of the pendulum 6, no torque will be exerted on the ball. In case, however, of relative inclination, a torque would be exerted due to a greater blast of air being exerted in one direction than the other to erect the ball and maintain it in its original position.

For supplying air for both the air bearings and air erection, I have shown the ball as enclosed within a casing 10 which supports the cups 2 and 3. Said casing is normally continuously evacuated by means of a pump (not shown) through the air hose coupling 11. Air is therefore drawn in through the screened openings 12 and 13 in said casing and through radial channels 14, 14' in cup 2 and similar channels 15, 15' in cup 3. Preferably, an additional channel 16 is provided in both cups below the axis of the ball in order to supply additional air at that point for supporting the weight of the ball. The air, continuously escaping between the cup and ball, effectively floats the same with little or no friction, so that the ball is free to turn in any direction and about any axis.

For supplying air to the erecting device, the ball is shown as provided with a vertical bore 17 therethrough, which communicates at its bottom with the chamber 18, having the above described ports 8, 8' and 9, 9' therein. Said ports are shown as formed in a threaded nipple 20 adapted to be screwed into an enlarged hole in the lower end of the ball. The bottom of the nipple is shown as provided with a spherical seat 21 for the ball 7 supporting the small pendulum 6.

At its top the ball may also be provided with a hollow stop button 22 which is adapted to strike the casing if the ball tilts through more than a predetermined angle.

The air which erects the ball enters through screened opening 23 in the top of the casing, which may be closed by a cap 24 having small apertures 25 therein. Preferably, however, I provide means for rendering the erecting device inoperative during turning of the aircraft, so that the ball will not be disturbed by lateral acceleration pressures. To this end, the perforated cap 24 may be replaced by a non-perforated cap 24', having a hose connection 26 in which is placed a shut-off valve 27. Said valve may be operated by hand, if desired, but preferably it is connected with a turn indicator 28, which is of well known construction, so that when the airplane turns in either direction the valve is temporarily closed and is opened again as soon as a straight course is reached.

The equator of the ball may be engraved as indicated in Fig. 1, showing azimuth directions by means of the perpendicular markings 30 and also showing the bank and climb by means of the equatorial band 31. Said band may be read in connection with the bank angle markings 32 on one side of the face, and also in connection with the climb and dive markings 33 on the other side of the face. Fig. 3 illustrates the appearance of the readings when the airplane is banking and Fig. 4 when it is climbing.

Besides furnishing both direction and attitude indications in one instrument, my invention also constitutes an improvement in the art of magnetic compasses, since my air floating support is extremely frictionless and also since my compass is believed to be less subject to the northerly turning error caused in most compasses by the action of the lateral acceleration forces on the heavy side of the magnetic needle. In my compass the magnetic needle may be balanced, the normal dip being prevented by the air erecting device without the use of unbalanced masses.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a magnetic compass for aircraft, a magnetic sensitive element, ball and cup air bearings for supporting the same in neutral equilibrium for turning about any axis, and an air erecting means on said element responsive to tilt of said element for applying a corrective non-gravitational torque about the horizontal axes of the element when said element tilts.

2. In an attitude-direction indicator for aircraft, an outer casing, a magnetic sensitive element, ball and cup air bearings for supporting said element in neutral equilibrium for turning about any axis within said casing, an air erecting means on said element responsive to tilt of said element for applying a corrective torque about the horizontal axes of the element, and compass, bank and climb indications on said element and casing.

3. A magnetic compass for aircraft, a sphere, a permanent magnet therein, a casing enclosing the sphere, spherical cups in the casing fitting opposite sides of the sphere, said cups having air ports therein for supplying air flow between the sphere and cups to float the sphere, and means whereby air may be continuously exhausted from said casing.

4. A magnetic compass for aircraft, a sphere, a permanent magnet therein, a casing enclosing the sphere, spherical cups in the casing fitting opposite sides of the sphere, said cups having air ports therein for supplying air flow between the sphere and cups to float the sphere, there being more ports below than above the normally horizontal plane through the center of the sphere, and an air erecting means on said sphere for preventing magnetic dip of the magnet.

5. In a magnetic compass for aircraft, a magnetic sensitive element, ball and cup air bearings for supporting the same in neutral equilibrium for turning about any axis, an air erecting means on said element responsive to tilt of said element for applying a corrective torque about the horizontal axes of the element to return the same to normal position, and means responsive to turning of the craft for temporarily rendering said air erecting means inoperative.

6. In an attitude-direction indicator for aircraft, an outer housing, a magnetic sensitive element, ball and cup air bearings for supporting the same in neutral equilibrium for turning about any axis, an air erecting means on said element responsive to tilt of said element for applying a corrective torque about the horizontal axes of the element to return the same to normal position, compass, bank and climb indications on said element and said housing, and means responsive to turning of the craft for temporarily rendering said air erecting means inoperative.

7. A magnetic compass for aircraft, a sphere, a permanent magnet therein, a casing enclosing the sphere, spherical shaped cup means in the casing for supporting the sphere for turning about at least its vertical axis, said cups having air ports therein for supplying air flow between the sphere and cup means to float the sphere, and means whereby air may be continuously exhausted from said casing.

8. A magnetic compass for aircraft, a sphere, a permanent magnet therein, a casing enclosing the sphere, spherical shaped cup means in the casing for supporting the sphere for turning about its three principal axes in neutral equilibrium, said cups having air ports therein for supplying air flow between the sphere and cup means to float the sphere, and means whereby air may be continuously exhausted from said casing.

9. An air borne magnetic compass comprising a free element the exterior of which has a spherical surface, a magnetic needle carried thereby, a support for said element having a cupped inner surface having a free fit with the surface of said element, and means for causing air flow between said surfaces to float said element on air films without exerting a torque on said element in any plane.

10. An air borne magnetic compass comprising an outer casing having means whereby air may be withdrawn therefrom, spaced cupped surfaces therein, a free magnetic element therein the exterior of which is spherical at least in part and which has a free fit in said cups, said cups having apertures connected to the exterior of said casing, whereby air is drawn between said surfaces to float said element on air bearings within said casing.

11. An air borne magnetic compass comprising an outer casing having means whereby air may be withdrawn therefrom, a magnetic element therein, spherical bearings for floating said element in said casing, and means for supplying air flow to said bearings including channels leading from the exterior of said casing to between the adjacent surfaces of said bearings.

12. An air borne magnetic compass as claimed in claim 11, in which the magnetic element has oppositely directed apertures therein also connected with the exterior of said casing and from which air jets are normally discharged.

BERT G. CARLSON.